United States Patent

Grensing et al.

[11] Patent Number: 6,042,658
[45] Date of Patent: *Mar. 28, 2000

[54] ALUMINUM-BERYLLIUM ACTUATOR ARMSET

[75] Inventors: Fritz C. Grensing, Perrysburg; James M. Marder, Shaker Heights; Jere H. Brophy, Chagrin Falls, all of Ohio

[73] Assignee: Brush Wellman, Inc., Cleveland, Ohio

[*] Notice: This patent is subject to a terminal disclaimer.

[21] Appl. No.: 08/937,274

[22] Filed: Sep. 15, 1997

Related U.S. Application Data

[63] Continuation of application No. 08/221,395, Mar. 31, 1994, Pat. No. 5,667,600, which is a continuation-in-part of application No. 08/156,356, Nov. 23, 1993, abandoned, which is a continuation of application No. 07/770,187, Oct. 20, 1991, abandoned.

[51] Int. Cl.⁷ .................................................. C22C 25/00
[52] U.S. Cl. ......................... 148/437; 420/528; 360/106
[58] Field of Search .................................. 148/437, 400; 420/528; 360/106

[56] References Cited

U.S. PATENT DOCUMENTS

| | | |
|---|---|---|
| 3,548,915 | 12/1970 | Richmond et al. ............ 420/528 |
| 3,548,948 | 12/1970 | Richmond et al. ............ 164/68 |
| 5,260,847 | 11/1993 | Basehore et al. ............ 360/106 |
| 5,384,505 | 1/1995 | Takahashi ............ 327/262 |
| 5,417,778 | 5/1995 | Nachtrab et al. ............ 148/400 |
| 5,421,916 | 6/1995 | Nachtrab et al. ............ 148/400 |
| 5,578,146 | 11/1996 | Grant et al. ............ 148/437 |
| 5,603,780 | 2/1997 | Nachtrab et al. ............ 148/400 |
| 5,642,773 | 7/1997 | Grensing et al. ............ 164/516 |

*Primary Examiner*—Scott Kastler
*Attorney, Agent, or Firm*—Calfee, Halter & Griswold, LLP

[57] ABSTRACT

Disclosed is a practical aluminum-based alloy containing 1 to 99 weight percent beryllium and improved methods for the investment casting of net shape aluminum-beryllium alloy parts.

13 Claims, 3 Drawing Sheets

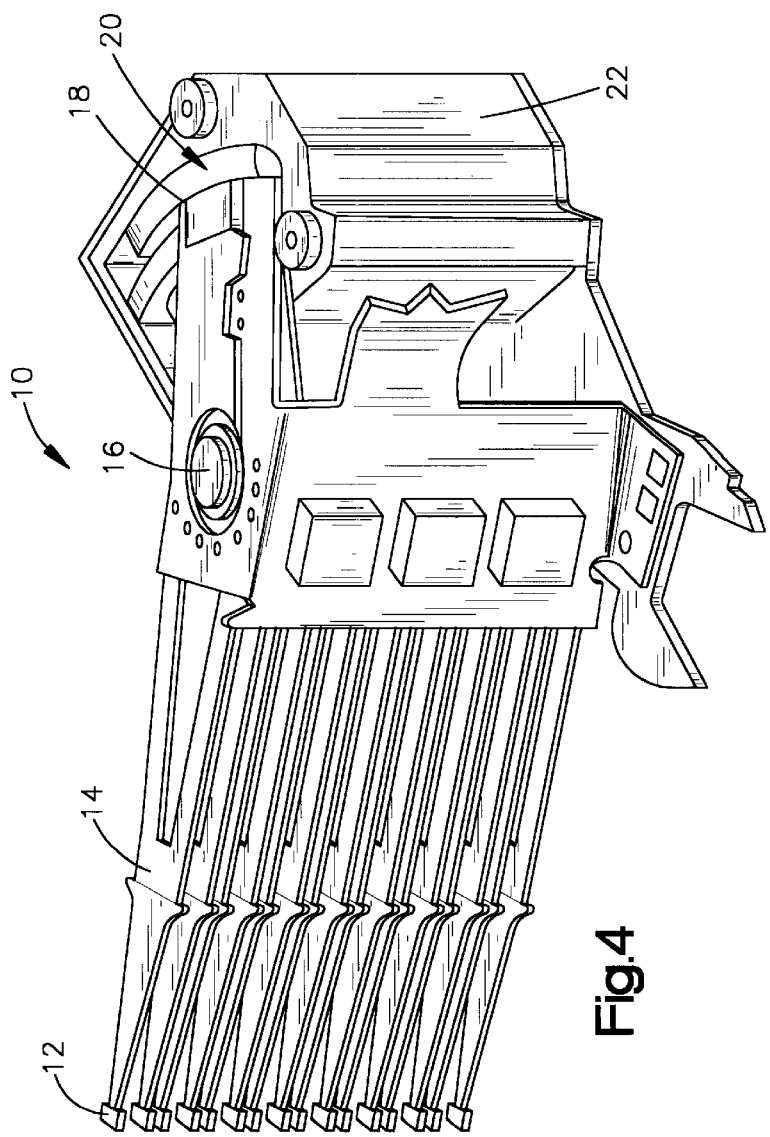
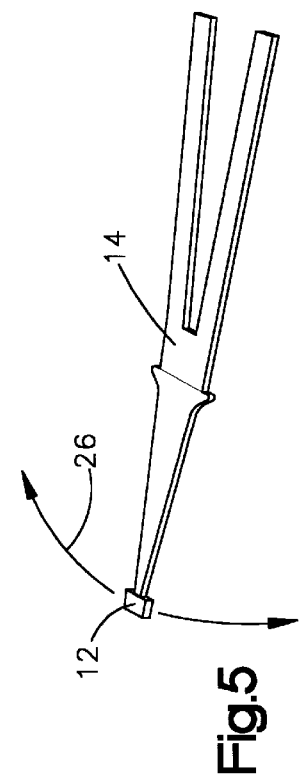
Fig.4
Fig.5

ALUMINUM-BERYLLIUM ACTUATOR ARMSET

This is a continuation of application Ser. No. 08/221,395, filed Mar. 31, 1994, now U.S. Pat. No. 5,667,600 which is a continuation-in-part of application Ser. No. 08/156,356 filed Nov. 23, 1993, now abandoned, which is a continuation of application Ser. No. 07/770,187 filed Oct. 2, 1991, also abandoned.

FIELD OF INVENTION

The present invention relates to alloys of beryllium and aluminum. More particularly, the invention describes a method for making alloys of aluminum containing beryllium and forming them into useful structural products by investment casting techniques.

BRIEF DESCRIPTION OF THE PRIOR ART

Alloys of aluminum and beryllium are known in the art. For example, Cooper U.S. Pat. No. 1,254,987 describes the addition of aluminum to beryllium for improving machinability. Fenn U.S. Pat. No. 3,337,334 discloses and claims the Lockalloy commercial product (developed by Lockheed and Berylco in the 1960's) which comprises aluminum base metal and 62 weight percent beryllium.

Lockalloy was produced in sheet form and incorporated into the ventral fin of the YF12 experimental aircraft (Duba, YF-12 Lockalloy Ventral Fin Program, Final Report, NASA CR-144971, 1976). Following the introduction of Lockalloy, extensive data was obtained on rolled alloys made from pre-alloyed aluminum having 62 weight percent beryllium. See, for example, London, Alloys and Composites, Beryllium Science and Technology, Volume 2, Plenum Press, New York (1979).

Second and third order elemental additions to aluminum-beryllium alloys are reported in the literature. They include additions of magnesium, silicon, nickel or silver for making ternary and quaternary alloys of aluminum and beryllium as described in McCarthy U.S. Pat. No. 3,664,889. These alloys are made from rapidly solidified alloy powder, consolidated and worked by conventional means. Russian work on ternary and higher order aluminum-beryllium alloys is variously described in Molchanova, Phase Equilibria in the Al—Be—Ni System at 600 Deg. C, Vest. Mosk. Univ. Khim., Vol. 27(3), pages 266–271 (1986); Komarov, Increasing the Strength of Welded Joints in an Al—Be—Mg Alloy by Heat Treatment, Weld. Prod., Vol. 26(1), pages 32–33 (1979); Kolachev, Constructional Alloys of Aluminum Beryllium and Magnesium, Metalloved. Term. Obrab. Metal. Vol. 13, pages 196–249 (1980); Nagorskaya, Crystallization in Al—Be—Mg—Zn Ouaternary System Alloys, Metalloved. Term. Obrab. Metal., Vol. 9, pages 72–74 (1973).

Minor amounts of beryllium are typically added to aluminum-rich alloys to prevent oxidation of the aluminum and other alloy components during processing steps like melting and pouring. As a primary example, Brush Wellman Inc., Elmore, Ohio produces and distributes aluminum-rich master alloys containing 10 percent or less beryllium for further processing by bulk producers. The residual beryllium level in downstream aluminum product is preferably less than 0.01 percent.

The most current aluminum-beryllium phase diagram shows a simple eutectic with essentially no terminal, solid solubility at either end. This Al—Be phase diagram, adopted from Murray, The Aluminum-Beryllium System, Phase Diagrams of Binary Beryllium Alloys, ASM International Monographs on Alloy Phase Diagrams, page 9 (1987), is reproduced as FIG. 1 in this specification.

Brush Wellman has conducted extensive research on aluminum alloys containing from about 10 to about 75 weight percent beryllium. See Hashiguchi, Aluminum Beryllium Alloys for Aerospace Application, European Space Agency Structural Materials Conference, Amsterdam (March 1992). The research showed that an aluminum alloy of about 62 weight percent beryllium is about 70 volume percent beryllium, and an alloy of 50 weight percent beryllium is about 59 volume percent beryllium. It was also discovered that the density and elastic modulus of alloy compositions in this system follow the Rule of Mixtures, i.e., interpolation of alloy properties is generally possible between the respective properties of pure beryllium and pure aluminum.

Results from studies at Brush Wellman's Elmore facilities have also shown that large cast ingots and fine pre-alloyed atomized powder particles can be produced with microstructures showing a metal composite including beryllium in an aluminum matrix. Presently, Brush Wellman markets these alloys as extrusions and stamped sheet products under the trademark AlBeMet™.

Brush Wellman has processed AlBeMet™ into useful component parts by two alternative routes. Both processes require vacuum melting of aluminum and beryllium starting materials in a ceramic-lined, refractory crucible at temperatures typically in the range between about 1350 to about 1450° C. In the first alternative, the liquified aluminum-beryllium melt is poured through a refractory nozzle to produce a stream which is intercepted by high velocity jets of an inert gas. The jets of gas break the liquid stream into tiny grains which solidify into a pre-alloy powder. Individual grains that comprise the powder pre-alloy have very fine dendritic microstructure consisting of a beryllium phase within an aluminum alloy matrix. The pre-alloy powder is then consolidated by cold isostatic pressing, hot isostatic pressing or extrusion to produce a gross shape which can then be machined into a useful article.

The second alternative for processing AlBeMet™ into component parts is a conventional ingot casting operation in which molten aluminum-beryllium is poured into a graphite mold cavity and cooled to a solid ingot up to six inches in diameter. The microstructure of this casting is a relatively coarse, dendritic beryllium phase within an aluminum alloy matrix. The casting surface and hot-top are removed and scrapped and the ingot is further processed by rolling, extrusion or machining into the final article shape. These alternatives are relatively expensive and cheaper net shaping processes are preferred.

Investment casting is a sub-set of precision metal processing which produces net shape parts to reduce subsequent machine losses. A disposable ceramic shell patterned after the intended structure is used as a mold for casting metal alloy articles. See Horton, Investment Casting, Metals Handbook, 9th Ed., Vol. 15, pages 253–287 (1984). Molten alloy is poured into the mold, an article is fabricated and the ceramic shell is destroyed as it is separated from the cooled metal alloy part.

Prior to the present disclosure, there have been no reports of investment casting for aluminum-beryllium alloys since conventional knowledge predicts great difficulty for investment casting any alloy with a large differential between liquidus and solidus temperatures as found in the aluminum-beryllium alloy system (see FIG. 1). The large difference between the liquidus and solidus temperatures of aluminum alloys containing the most useful beryllium levels theoretically makes casting these alloys very difficult or nearly impossible. For instance, an art-recognized casting defect known as "hot tearing" increases with differences between the liquidus and solidus temperatures of the cast alloys. See Davies, Contraction Cracks, Solidification and Casting, pages 174–176, Applied Science Publishers, Essex, England (1973).

The present specification describes solutions to the stated problems for making alloys of aluminum containing beryllium and further discloses an improvement for investment casting of metal alloys.

OBJECTS OF THE INVENTION

It is an object of the present invention to provide practical net shape parts of aluminum-based alloys with beryllium additions in the range of 1 to 99 weight percent by modified investment cast processing.

It is also an object of the present invention to provide practical net shape parts of an aluminum-based alloy with beryllium additions, preferably in the range of 5 to 80 weight percent.

It is another object to provide a method for investment casting which selectively employs alloying elements for improving the castability and properties of the resulting net shape parts.

A further object of the present invention is to provide an improved, cost-effective investment casting method for producing complex shapes of an aluminum-based alloy with beryllium additions, preferably in the range of 5 to 80 weight percent.

Another object is to provide a production method which uses near net shape dies to reduce machining costs.

It is yet another object to provide a method by which precision, net shape aluminum components can be formed with significant amounts of beryllium.

Other objects of the present invention will become apparent to those skilled in the art after a review of the following disclosure.

SUMMARY OF THE INVENTION

The current state of the art for fabricating structures from aluminum-beryllium based alloys is directed to powder metallurgy. Pre-alloyed powder is atomized, consolidated and subject to standard metal working practices to produce a blank for machining into the final part.

The present disclosure teaches precision investment casting of aluminum-based alloys containing significant amounts of beryllium to produce practical net shape aluminum-beryllium components directly from raw input materials. The term "net shape" as used in this specification describes a component which is very near its final form, i.e., a precision casting that requires very little further machining before end-use application.

This invention successfully uses investment casting to manufacture aluminum alloys containing beryllium. The presently claimed alloys (and corresponding parts) have densities lower than other known aluminum alloys and a modulus of elasticity nearing that of beryllium. The modulus increases with beryllium content and approaches a linear combination between the modulus of aluminum at 10.0 million psi and the modulus of beryllium at: 44 million psi.

The following table summarizes the properties of the various beryllium-containing aluminum alloys made according to the present invention.

TABLE I

Beryllium-Containing Aluminum Alloy Property Comparison

| Be (Wt %) | Density (lb/in$^3$) | Modulus (MSI) | E/Rho (in × 10$^6$) | CTE (in/in/° F. × 10$^6$) |
|---|---|---|---|---|
| 0 | 0.097 | 10.0 | 102.6 | 13.1 |
| 5 | 0.095 | 12.4 | 130.5 | 12.6 |
| 10 | 0.093 | 14.7 | 158.3 | 12.2 |
| 15 | 0.091 | 17.0 | 186.2 | 11.7 |
| 20 | 0.089 | 19.1 | 214.0 | 11.3 |
| 25 | 0.087 | 21.1 | 241.9 | 10.9 |
| 30 | 0.086 | 23.1 | 269.7 | 10.5 |
| 35 | 0.084 | 25.0 | 297.6 | 10.2 |
| 40 | 0.082 | 26.8 | 325.4 | 9.8 |
| 45 | 0.081 | 28.5 | 353.3 | 9.5 |
| 50 | 0.079 | 30.2 | 381.1 | 9.1 |
| 62 | 0.076 | 33.9 | 448.0 | 8.4 |
| 70 | 0.074 | 36.3 | 492.5 | 7.9 |
| 80 | 0.071 | 39.0 | 548.2 | 7.4 |
| 90 | 0.069 | 41.6 | 603.9 | 6.9 |
| 100 | 0.067 | 44.0 | 659.7 | 6.4 |

The commercial market requires aluminum based alloys with higher elastic modulus and lower density. As indicated in Table I, a continuous variation of properties from those of the aluminum alloy at one extreme to beryllium at the other is achieved. For example, a 5 percent beryllium increment produces a 25 percent higher modulus at about the same density when compared to the aluminum alloy base.

Investment casting of aluminum and beryllium offers previously unknown latitude for selecting the size and shape of component parts. According to the present invention, highly porous net shape parts require very little machining to arrive at the final product. As a result, labor and material costs are dramatically reduced when compared to products which are "hogged out" from a bulk shape.

The present invention has universal application to a wide variety of parts including, but not limited to, aerospace fuselages, emergency door latches, steering columns, engine pylons, support structures, wing stabilizers, rotor swashplates avionic boxes, turbine engines, manifolds, gear boxes, diffusers, particle separators, oil tanks, stators, compressors, pumps, hydraulic equipment, electronic packaging, electro-optical components, computer and disk drive hardware, sporting equipment and the like.

A full description of the present invention will now be provided with reference to the figures and examples that follow.

BRIEF DESCRIPTION OF THE DRAWINGS

FIG. 4 illustrates an assembly of read/write heads comprised of the presently disclosed aluminum-beryllium alloy.

FIG. 5 shows a net shape, single actuator arm from the assembly of FIG. 4. Forces exerted on the arm are represented by vectors.

DETAILED DESCRIPTION OF THE INVENTION

Figure 1:
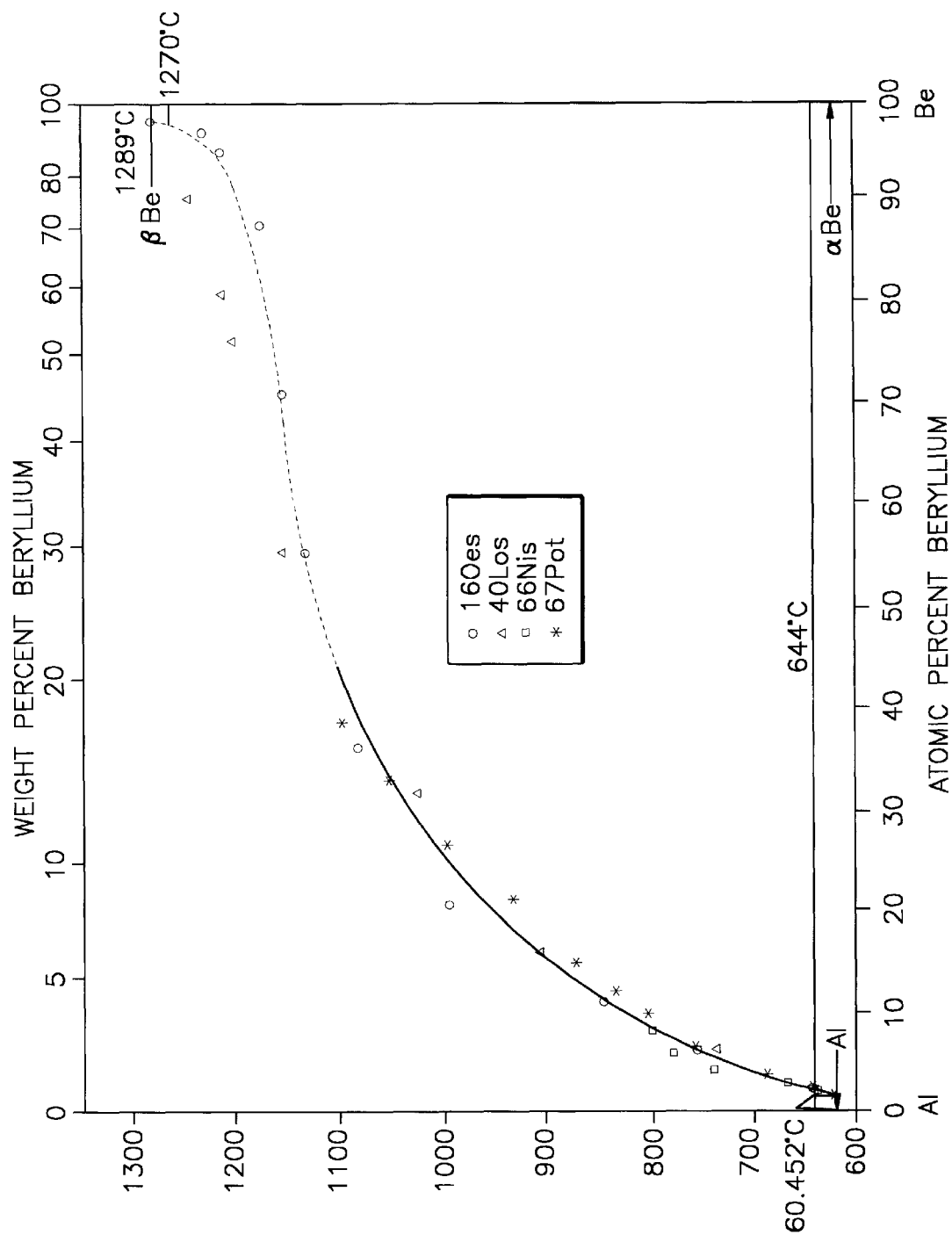
FIG. 1 is a current aluminum-beryllium phase diagram.

The examples below were conducted to produce net shapes of aluminum alloys containing additions of beryllium. Such aluminum-beryllium alloys were produced into net shapes through investment casting following the selected parameters. The examples clearly demonstrate that investment casting of an aluminum alloy with significant amounts of beryllium is successful according to the present methods.

All environmental health and safety equipment, including supplementary HEPAVAC ventilation, are installed prior to the initiation of trials. Air counts are taken periodically during the trials and final clean-up operation. All participants wear suitable air filter masks and clothing during the trials. Further safety details are available from Brush Wellman Inc., Cleveland, Ohio.

EXAMPLE 1
Investment Casting of an Aluminum-Beryllium Alloy Part

An alloy charge weighing 8 pounds with a composition of 38 weight percent clean aluminum rod and 62 weight percent clean beryllium lump was placed in an induction-heated alumina-magnesia crucible. Aluminum rod, with 99+ percent purity, was obtained from Alfa Johnson Mathey, Ward Hill, Mass. and Grade B-26-D beryllium was supplied by Brush Wellman. The crucible was situated inside a water-cooled steel chamber which could be evacuated to a vacuum of $1 \times 10^{-4}$ torr. Also located in the steel chamber was a resistance-heated preheat furnace containing a ceramic shell mold. The mold was fabricated by dipping a beryllia (BeO) slurry over a wax pattern which consisted of three rods attached to each other by a sprue. A commercial part is manufactured by substituting a wax pattern which matches the configuration of interest.

The vacuum furnace was equipped with an optical pyrometer to measure the temperature of the melt and a thermocouple to measure the temperature of the ceramic mold. Power to the pre-heat furnace was turned on at 600° C. When the temperature of the mold reached 600° C. (total time about 16 hours), the induction field was activated and the aluminum charge melted under vacuum of approximately 0.1 torr. Total time between power-on and melting was two hours. Once molten, the temperature of the liquid metal was increased to 1375° C. to provide superheat to the melt. During this period of time, the vacuum increased to 0.8 torr because of outgassing from the melt. The melt was maintained at 1375° C. for five minutes to provide uniform heating and stirring of the melt. After the hold period, the melt was poured into the ceramic mold where it solidified.

After casting, all power to the crucible and mold preheat furnace was shut off and the mold cooled to room temperature overnight. Once cool, the ceramic was separated from the now solidified aluminum-beryllium alloy using a hammer and sandblasting unit. The bars were cut from the sprue and samples were prepared for metallographic and mechanical property analysis. The microstructure of the cast alloy consisted of beryllium dendrites surrounded by an aluminum matrix. Several small regions of porosity were also observed in the microstructure. Tensile samples machined from the other bars were not tested because of porosity in the microstructure.

EXAMPLE 2
Investment Casting of an Aluminum-Beryllium Disk Drive Arm

Figure 2:
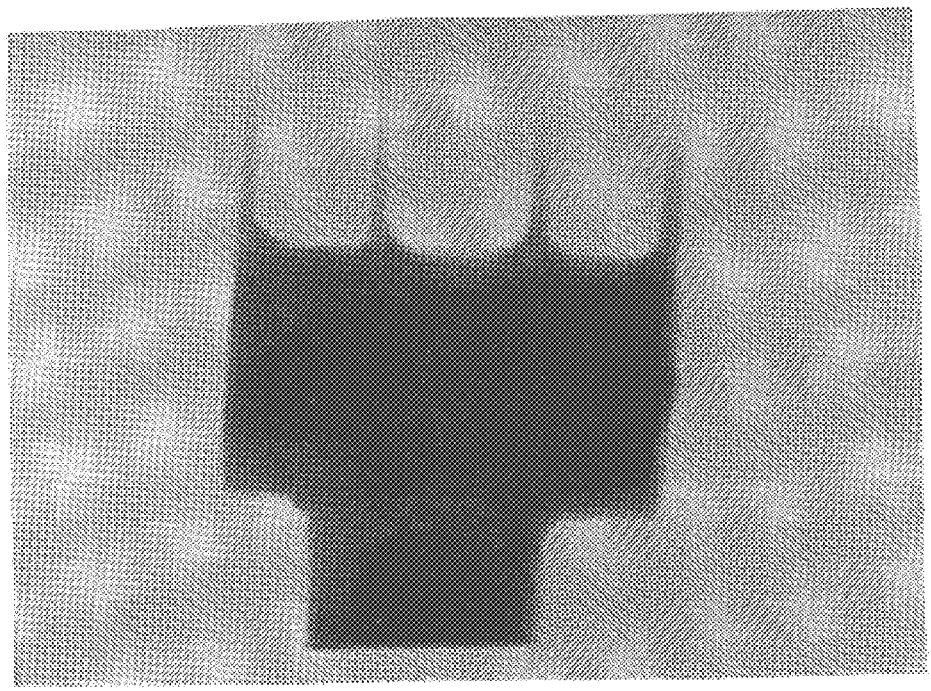
FIG. 2 is an x-ray radiograph of an investment cast aluminum-beryllium disk drive arm made according to the present invention.

To demonstrate the principles of the present invention, a net shape disk drive arm was investment cast from aluminum and beryllium. The resulting drive arm is shown in the x-ray radiograph presented as FIG. 2.

A wax pattern was specified by Brush Wellman, and designed by Precision Castparts Corporation, Minerva, Ohio, to simulate a four-fingered drive arm. This four-fingered configuration was selected to demonstrate the versatility of the present invention. Two wax patterns were joined so that two parts could be recovered from a single pour. The wax was coated to make a ceramic casting mold and removed using the "lost-wax technique" which is well known in the art.

The mold was placed in a vacuum casting furnace and electrically preheated. An aluminum alloy containing 62 weight percent beryllium was melted in the vacuum furnace and poured into the mold as described in Example 1. After cooling, the ceramic mold was chipped off the casting, leaving two well formed drive arms and associated gating. The cast parts were x-rayed and superior integrity was confirmed by the radiograph of FIG. 2.

EXAMPLE 3
Investment Casting of Parts

Figure 3:
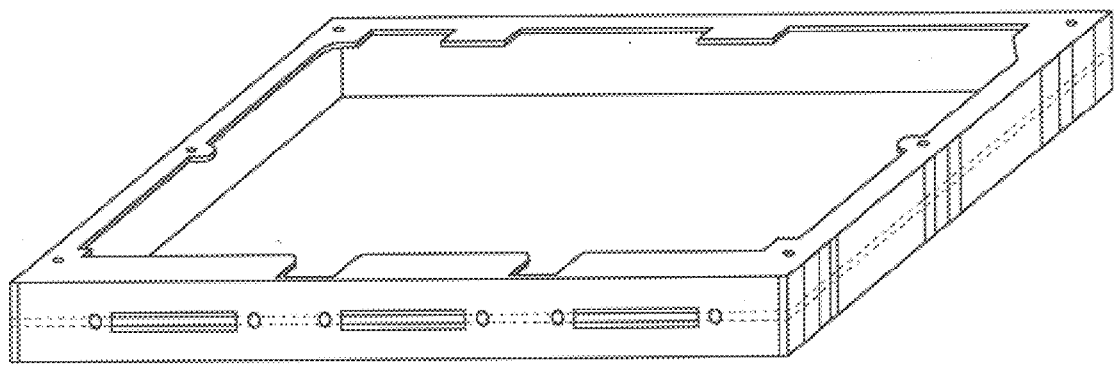
FIG. 3 is an avionics box investment cast from an aluminum-beryllium alloy made according to the present invention.

The procedures outlined in Examples 1 and 2 were followed to make the avionics box illustrated in FIG. 3. This box has all the characteristics suitable for modern aircraft, including high stiffness, good mechanical support, low weight and excellent heat removal characteristics, with a coefficient of thermal expansion low enough to ensure stability during temperature cycling.

The methods of Examples 1 and 2 were also followed to make the structures shown in FIGS. 4 and 5. These figures illustrate a rotatable armset of an actuator having a bore for rotating about the shaft of a disk drive for positioning a head radially across a disk, wherein the armset is a one piece unit consisting essentially of an alloy of aluminum containing from about 1 to about 99 weight percent beryllium made by investment casting.

In particular, FIG. 4 illustrates a read/write assembly for hard disk drive 10 having multiple heads 12 mounted on actuator arms 14. Heads 12 and actuator arms 14 are assembled together on actuator shaft 16 which is rotated by the interaction of wire coil 18 and magnet 20 disposed in magnet housing 22. Actuator arms 14 are spring loaded to rest on the disk when it is stationary. When the disk is rotated, air pressure develops beneath head 12 and lifts it slightly above the disk.

Actuator arms 14 are subjected to vertical forces 24 and angular forces 26 as shown in FIG. 5. Actuator arms 14 should be sufficiently stiff to minimize the amplitude of vertical vibration and avoid damaging the disks above and below actuator arms 14. Likewise, actuator arms 14 should be sufficiently stiff to minimize the amplitude of lateral vibration and provide a more rapid response time for reading or writing at an appropriate address on the disk. Laminated materials are effective in minimizing deflections principally in the vertical direction. The aluminum-beryllium alloy made according to the present invention is effective to minimize deflections in both the vertical and lateral directions.

EXAMPLE 4
Investment Casting a Ternary Al—Be—Ni Alloy

An alloy charge weighing 10 pounds was produced with a composition of 35 weight percent clean aluminum rod, 62 weight percent clean beryllium lump and 3 weight percent nickel pellets (99.7 percent pure, obtained from Alfa-Johnson Mathey). The charge was placed in an induction-heated alumina-magnesia crucible located in the vacuum furnace described in Example 2. A shell mold placed in the resistance-heated preheat furnace was patterned after sixteen tensile test bars. For commercial applications, the test bars are replaced with end-use configurations such as the avionics box described above.

Using the resistance-heated preheat furnace, the mold temperature was increased to 700° C. over a period of about 16 hours. The induction field was activated and the aluminum, beryllium and nickel charge was melted under vacuum of approximately 0.1 torr. Total time between power-on and melting was two hours. Once molten, the temperature of the liquid metal was increased to 1375° C. to provide superheat to the melt. The melt was maintained at 1375° C. for five minutes to provide uniform heating and stirring of the melt. During this period, argon gas was bled into the furnace chamber until the pressure reached one atmosphere. The alloy melt was then poured into the ceramic mold.

After pouring, the power to the crucible and preheat furnace was shut off and the metal-filled ceramic mold was allowed to cool overnight. Once cool, the ceramic was separated from the aluminum-beryllium-nickel alloy casting using a hammer and sandblasting unit. The tensile bars were cut off using a band saw, and samples were cut from the gating for metallographic analysis.

The microstructure of the cast alloy consisted of beryllium dendrites surrounded by an aluminum matrix. Examination of the specimen in a scanning electron microscope, equipped with an energy dispersive x-ray capability, indicated that the nickel alloying addition had migrated to the beryllium phase. Porosity was still observed in the microstructure, but the volume fraction of porosity was decreased. Tensile properties were measured for several test bars. The 0.2 percent yield strength was found to be 22,000 psi, the ultimate tensile strength was 25,000 psi and the elongation was 2.1 percent.

The cast parts fabricated in this example were placed in a hot isostatic press (HIP) and heated to 450° C. for two hours, while a pressure of 15,000 psi was applied. Metallographic analysis of the parts after this treatment revealed that the combination of temperature, time and pressure eliminated most of the porosity not connected to the surface.

EXAMPLE 5

Investment Casting of Higher Order Aluminum-Beryllium Alloys

Alloys of aluminum and beryllium containing other elements can be fabricated using the process outlined in Example 3. The alloy composition may be represented by the following formula: (30–75% Be)+(25–70% Al)+(0.25–5% X)+(0–5% Y)+(0–0.5% Z) where the letters X, Y and Z designate elements listed below in Table II and the total weight of alloy components must equal 100 percent.

TABLE II

Alloying additions for Aluminum-Beryllium alloys

X—Nickel, Cobalt, Copper
Y—Silver, Silicon, Iron
Z—Titanium, Zirconium, Boron, Scandium, Yttrium, and all elements considered rare earth elements.

For example, the components for a 10 pound alloy charge with a composition of 30 weight percent aluminum rod, 64 weight percent beryllium lump, 3 weight percent nickel, 1.5 weight percent silver and 1.4 weight percent silicon were placed in an induction-heated alumina-magnesia crucible located in the vacuum furnace described in Example 2. An addition of 0.1 weight percent titanium is placed in a hopper for addition to the melt just prior to casting. A shell mold to receive the molten alloy is placed in a resistance-heated preheat furnace. The mold may match the configuration for tensile bars, engineering shapes, sports equipment and the like.

Using the preheat furnace, the mold temperature is increased to between 350° C. and 1275° C. The exact temperature depends on the mold shape and alloys cast. If a mold preheat unit is available, the mold may be heated outside the furnace and placed into a casting chamber just prior to pouring. This casting chamber should be separated from the melting chamber by a vacuum tight valve which may or may not have its own heat source.

When the mold reaches the selected preheat temperature, the induction field is activated and the components of the aluminum-beryllium alloy are melted together. The vacuum during melting must not be lower than 0.0001 torr or excessive vaporization of the alloying elements will occur. Once molten, the temperature of the liquid metal was increased to no more than 1500° C. to provide superheat to the melt. One minute prior to pouring, titanium is added to the melt to promote fine grain and produce a dispersion of fine, hard intermetallic particles in the final product. One minute after the titanium is added, the melt is poured into the ceramic shell mold.

After pouring, the power to the crucible and preheat furnace was shut off and the metal-filled ceramic mold was allowed to cool to room temperature. Alternatively, the hot mold can be removed from the furnace for cooling. Once cool, the ceramic was removed from the aluminum-beryllium alloy casting using mechanical or chemical methods, or a combination thereof. The useful parts are removed from the casting for further processing.

Higher order alloys like those described in this example can be improved for strength and ductility by one or more heat treat processes which are well known in the aluminum alloy art. A hot isostatic pressing (HIP) step, as described in Example 3, can be used either before or after the heat treatments.

Various modifications and alterations to the present invention may be appreciated based on a review of this disclosure. These changes and additions are intended to be within the scope and spirit of this invention as defined by the following claims.

What is claimed is:

1. A rotatable armset of an actuator having a bore for rotating about an actuator shaft for positioning a head of the actuator radially across a disk of a disk drive, wherein the armset is a one piece unit entirely comprised of an investment cast alloy of an aluminum component and beryllium.

2. A rotatable armset for use in a disk drive actuator, the armset defining at least one arm for positioning a head of the actuator radially across the disk of a disk drive, the armset further defining a bore for rotating the armset about an actuator shaft, wherein the armset is a one-piece unit entirely comprised of an investment cast alloy of an aluminum component and beryllium.

3. The armset of claim 2, wherein the armset defines multiple arms.

4. The armset of claim 3, wherein the armset is made from an alloy containing about 1 to 99 weight % beryllium.

5. The armset of claim 4, wherein the alloy contains about 5 to 80 weight % beryllium.

6. The armset of claim 5, wherein the alloy contains about 5 to 80 weight % beryllium dispersed in an aluminum-rich composition.

7. The armset of claim 6, wherein the aluminum-rich component contains magnesium, nickel, silicon, silver, lithium or mixtures thereof.

8. The armset of claim 5, wherein the aluminum-rich component is composed of substantially pure aluminum.

9. The armset of claim 4, wherein the armset has a modulus of elasticity at least 25% higher than that of aluminum.

10. The armset of claim 2, wherein the alloy contains 30 to 75 wt. % Be, 25 to 70 wt. % Al, 0.25 to 5 wt. % X, 0 to 5 wt. % Y and 0 to 0.5 wt. % Z, wherein:

X is Ni, Co, Cu or mixtures thereof,

Y is Ag, Si, Fe or mixtures thereof, and

Z is Ti, Zr, B, Sc, Y, a Rare Earth element, or mixtures thereof.

11. The armset of claim 10, wherein the alloy contains a Y element.

12. The armset of claim 10, wherein the alloy contains a Z element.

13. The armset of claim 10, wherein the alloy has the following properties
   (a) a coefficient of thermal expansion of about 6.4 to 13.0 in/in/°F.×$10^{-6}$,
   (b) a modulus of about 44.0 to 10.0 MSI, and
   (c) a density of about 0.067 to 0.063 lbs/in$^3$.

* * * * *